United States Patent
Nugent

[11] 4,227,874
[45] Oct. 14, 1980

[54] TEMPERATURE RESISTANT, STRUCTURALLY STABLE MEMBER

[75] Inventor: John J. Nugent, Huntington, Conn.

[73] Assignee: Rolock, Inc., Fairfield, Conn.

[21] Appl. No.: 909,097

[22] Filed: May 24, 1978

[51] Int. Cl.³ .............................................. C21D 9/00
[52] U.S. Cl. ................................... 432/261; 428/663; 148/6; 148/31.5
[58] Field of Search ................ 432/261; 428/681, 663, 428/614; 148/6, 31.5

[56] References Cited

U.S. PATENT DOCUMENTS

| | | | |
|---|---|---|---|
| 2,508,465 | 5/1950 | Offinger et al. | 428/663 X |
| 2,823,151 | 2/1958 | Yntema et al. | 148/31.5 |
| 2,857,297 | 10/1958 | Moore et al. | 148/6 |
| 2,878,554 | 3/1959 | Long | 29/198 |
| 3,336,120 | 8/1967 | Yoda et al. | 428/663 |
| 3,589,694 | 6/1971 | Gelling et al. | 432/261 |
| 3,632,095 | 1/1972 | Rode et al. | 432/261 X |
| 3,739,921 | 6/1973 | Schmidt | 432/261 X |

FOREIGN PATENT DOCUMENTS 45-27702  9/1970  Japan ........................................ 428/663

*Primary Examiner*—Edward G. Favors
*Attorney, Agent, or Firm*—Parmelee, Johnson, Bollinger & Bramblett

[57] ABSTRACT

A heat resistant, structurally stable member is provided for in high temperature, heat treatment processing. It includes a core which has a high melting point higher than the processing temperature but which crystallizes, and so becomes frangible, at temperatures lower than the processing temperature. It is encased in a covering of a weldable, non-crystallizing alloy which may begin to soften at lower than processing temperatures, but is thick enough to be welded and to prevent loss of strength of the core due to crystalline shattering. Consequently, this structural member retains rigidity during high temperature usage.

A plurality of structural members are welded together to form racks or baskets for holding parts during heat treatment in high temperature processing.

13 Claims, 4 Drawing Figures

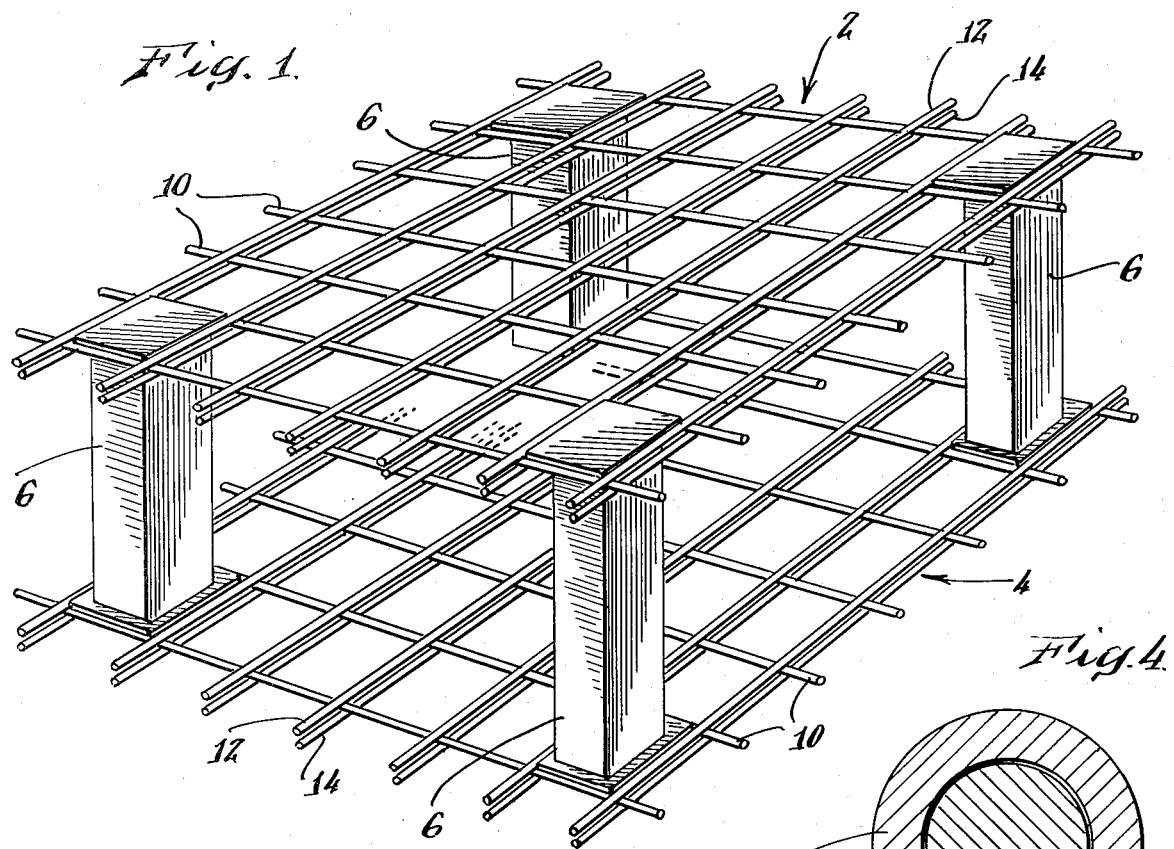
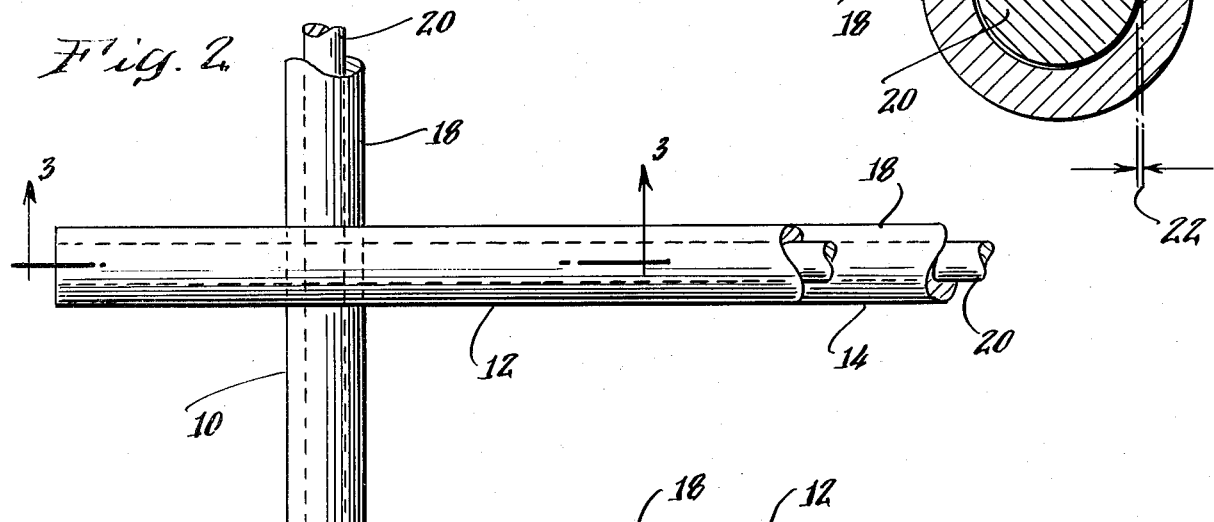
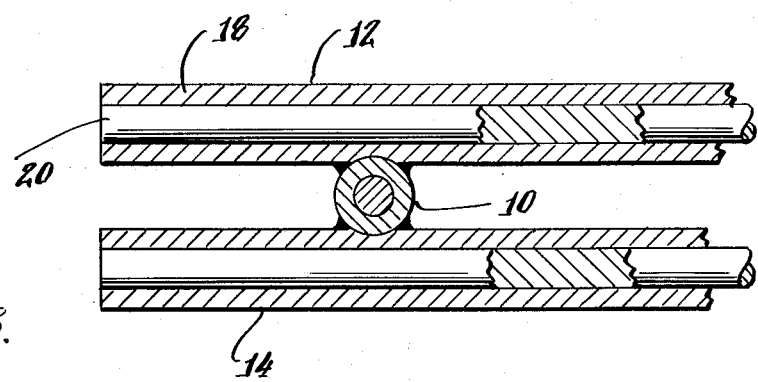

TEMPERATURE RESISTANT, STRUCTURALLY STABLE MEMBER

BACKGROUND OF THE INVENTION

This invention relates to the field of heat treatment of various metals to enhance their strength, resiliency, and the like. In the past, the materials have been treated, for various time periods, in heat treating ovens, in air, in vacuum, or in the presence of selected gases, at high temperatures. The treatment is usually carried out in specially designed ovens in which the materials to be treated are held on carrying racks or carrying baskets.

As the heat treating field has developed in recent years, treating temperatures have increased. It has been found that treatment at higher temperatures both improves the treatment and decreases the length of treatment time. These higher temperatures, however, have provided problems because the materials out of which the baskets and racks have been made have been unable to withstand the temperatures used and retain structural integrity.

Prior racks and baskets have been made of various nickel-chromium alloys. These lose their strength at temperatures such as 2,300° F., a temperature which is not uncommon today. The industry, therefore, has gone to the use of materials such as molybdenum, which has a melting point of about 4,800° F. Molybdenum, however, crystallizes and becomes brittle when raised to temperatures higher than about 1,800° F. Consequently, though baskets and racks made of molybdenum can be used, they will become very brittle and, if dropped, are likely to shatter. Since molybdenum is an expensive metal, the baskets and racks have had to be handled carefully, and, regardless, usually do not enjoy a very long life span before breakage.

In addition, in the making of racks and baskets, bars or rods of the metal used have to be welded together. This high temperature welding, by itself, can cause crystallization of molybdenum at the weld points, making the baskets brittle, even before their first use in high temperature ovens.

SUMMARY OF THE INVENTION

The above problems can be solved, and the structural strength of molybdenum can be utilized if the molybdenum is encased and covered with a relatively thick layer of one of various alloys, even though the alloy used has a softening temperature lower than the temperature of the heat treating process. This covering must be more than a mere coating; it must be thick enough to give integrity, and so structural strength, to the molybdenum and also thick enough so that the covering itself is welded, rather than the molybdenum, when the baskets and racks are made. The result is that the covering holds the molybdenum in position and keeps it from shattering even after it has crystallized.

One type of usable bar or rod would be one made up of a central core of molybdenum covered with a weldable alloy. The core would have a diameter of approximately 0.355" and would be surrounded by a hollow rod having a standard ¼" "iron pipe size" ("IPS"). Such rod would have an outer diameter of 0.540" and an inner diameter of 0.364", therefore, providing a weldable covering over the molybdenum about 0.088" thick or, rounded off, about 100 mils. Normally, in assembly, the core is simply pressed into the hollow rod.

The surrounding protective covering would be of nickel-chromium alloy preferably having a softening temperature greater than 2,300° F., and would be of wrought, not cast, materials. It should be weldable and have a coefficient of expansion at least as great as that of the core. Preferably, it should have a high degree of oxidation resistance, with a minimum of scaling, and be among the metals commonly associated with high temperature service, i.e. metals above the eutectic point of iron. Examples of such alloys are the standard AISI 330 alloy and alloys sold under the "Inconel" trademark as alloys 600, 601, and 617.

In essence, a heat resistant, structurally stable bar is provided by using a strengthening core having a melting point higher than the temperatures used in the heat treating processes, which, through it may crystallize at temperatures below those of the treating processes, will maintain its rigidity and not soften at those temperatures, the core being encased in a protective covering of weldable material having a crystallization temperature higher than the process temperature and being of sufficient thickness to be welded and to maintain the core against frangibility at temperatures up to the process temperature.

It should be noted that the core is encased in a thick covering of protective material, not simply coated with it.

After the molybdenum rod has been covered with the alloy, a series of rods may be welded together in a cross-hatched pattern to form a rack, or shaped and welded to form a heat treating basket. The welding is of the outer covering. To the extent that the heat of the welding, or subsquent use in heat treatment, causes the molybdenum to crystallize, that metal remains encased in the covering and, consequently, is structurally supported against frangibility. Meanwhile, the strength of the molybdenum retains the rack or basket intact.

DESCRIPTION OF THE DRAWINGS

Turning to the drawings, FIG. 1 is illustrative of the type of rack that may be made using the bars of this invention; it is a perspective view showing a pair of racks, separated by supporting stanchions, as the racks might be used in a heat treatment oven.

FIG. 2 is a plan view of one intersection of rods in a rack, with the rods welded together. The ends have been partially cut away to show the use of the core within the covering.

FIG. 3 is a section taken on line 3—3 of FIG. 2 showing the weld joint of FIG. 2.

FIG. 4 is a cross-section of an individual bar showing the internal configuration and the unitary structure of the inner molybdenum core and the outer alloy covering.

DETAILED DESCRIPTION OF THE INVENTION

FIG. 1 shows two racks 2 and 4 of the type used in heat treating ovens and which can be made with the temperature-resistant, structurally stable rods of the present invention. As shown, racks 2 and 4 are spaced one above another by use of four spacing stanchions 6. Racks 2 and 4 may be similar. Though the racks may be formed in varying designs, the particular racks disclosed include a series of rods positioned at 90° angles to one another, with one group of rods 10 going in one direction and two groups of rods 12 and 14 going in the transverse direction and sandwiching rods 10 therebetween. As shown, rods 12 are above the rods 10, and rods 14 are below rods 10. Rods 12 and 14 are parallel to, and above, one another.

The rack can, of course, be made with only a single layer of rods going in each of the transverse directions. Similarly, instead of making a rack, the ends of the rods may be curved upwardly and additional circumferential rods passed around them to form a basket of desired configuration.

FIGS. 2 and 3 show a typical intersection of one of rods 10 with a pair of rods 12 and 14. The actual welding points are shown in FIG. 3. Preferably each of the rods in a rack is of the same structure and cross-sectional dimension. The rods have been cut away at their ends to show the protective covering 18 and the strengthening core 20.

If desired, a simple cap closure (not shown) may be secured at the end of the rods to protect and retain the strengthening core 20 within the protective covering 18. This closure would be applied, for example, at the left end of rods 12 and 14, the lower end of rod 10 in FIG. 2 (assuming that the intersection disclosed is one at the edge of the rack), and at the left end of rods 12 and 14, as shown in FIG. 3. Normally, however, such cap is unnecessary once rods have been welded.

FIG. 4 shows a cross-section of a typical rod structure with its protective covering 18 and strengthening core 20. Covering 18 should be substantially contiguous with strengthening core 20, but need not be an absolutely tight fit (as indicated in the drawing by the space 22).

Strengthening core 20 should be made of a material that will not soften at the highest anticipated temperature ranges, usually somewhat over 2,300° F. Preferably, the core is made of molybdenum, which has a melting point of approximately 4,730° F. (2,610° C.) This metal, however, has a tendency to recrystallize and become brittle when raised to temperatures higher than about 1,800° F. (about 980° C.). The use of molybdenum alone for making racks or baskets can provide the structural strength necessary at high treatment temperatures; but, due to crystallization, the racks or baskets would have a tendency to shatter if not handled with great care. The core used should be so dimensioned that it will, by itself and absent a covering, have sufficient strength to be made into racks or baskets capable of use to hold articles during heat treatment.

The outer protective covering 18, on the other hand, is made of a ductile, weldable alloy which, though it may soften at the heat treating temperatures used, will not crystallize or become brittle; preferably, the covering material should have a coefficient of expansion under temperature change which is slightly greater than that of the material of the strengthening core. Protective covering 18 is used to encase and bind the molybdenum.

The complementary use of the alloy covering and the molybdenum casing will provide a function not heretofore available, i.e. weldability, strength, high temperature resistance, and lack of brittleness. Therefore, it becomes ideal for use in high temperature heat treating ovens.

Various alloys may be used to make protective covering 18. As contrasted with the strengthening core 20, which must have the primary characteristics of high melting point and retention of rigidity under high temperatures, even though it may crystallize, the protective covering must have the characteristics of weldability, no crystallization or substantial softening at the anticipated oven temperatures, i.e. over about 2,300° F., a coefficient of expansion equal to or slightly greater then that of the strengthening core, and oxidation resistance. Of those alloys that have been found to be good for this purpose, one designated by the American Iron and Steel Institute as AISI 330, a nickel alloy is useful. This is especially so because it has a melting point of approximately 2,550° F. (about 1,400° C.). Other satisfactory alloys include one sold under the trademark "Inconel" and designated by the numbers 600, 601 and 617.

Construction of the temperature resistant rods may be by any convenient means. It has been found to be simplest and most satisfactory to use a tube or pipe of the protective covering 18 and a solid rod of the strengthening core that will just fit within the pipe, and then tamp one into the other. The core should have a cross-section great enough to provide, by itself, the entire support strength needed in the finished rack or basket. Depending upon the dimensioning and strengths desired, the strengthening core may be hollow.

By way of example, a rod may be formed by taking a tube of the protective covering material designated by standard "IPS" (iron pipe size) dimensioning criteria as one-quarter inch. This tube would ordinarily have an outer diameter of 0.540", an internal diameter of 0.364" and a wall thickness of 0.088" thickness. A ⅜" diameter molybdenum rod (0.375") may be reduced in diameter by centerless grinding to about 0.355". This molybdenum strengthening core can then be inserted into the protective covering tube by either dropping it in or tapping it in gently at room temperature. If desired, the end of the completed rod may be capped to be certain that the strengthening core will remain in position, but, if dimensioned properly, the core will frictionally interengage with the inner surface of the cover and be held in place by friction. As a practical matter, a cap is usually unnecessary because once the racks or baskets have been welded, additional presure will be exerted by the protective covering on the strengthening core, thus locking the core in position.

Other examples could include use of a standard "IPS" tube designated as one-eighth inch (0.405" outer diameter; 0.269" inner diameter). This would receive a 0.250" molybdenum rod without grinding, or an "IPS" three-eighths inch tube (0.675" outer diameter; 0.493" inner diameter) could be used, in this instance, the core would be made of 0.500" molybdenum rod which had been centerless ground to a diameter of about 0.480". Because of the strength of the molybdenum rod core, it is believed that the core could be as narrow as about three-sixteenths inches (0.1875"), surrounded by an appropriate size tube, and be satisfactory.

As mentioned above, protective covering 18 should have a great enough thickness so that it may be welded. It should also be thick enough to be self-sustaining (it is more than a mere coating). Minimum weld thickness are usually 0.020" and preferably are greater than 0.30". Thus, the example given above with a wall thickness of 0.088" is adequate.

The completed rods may then be formed and welded into racks or baskets, as desired, and as has conventionally been done with nickel chrome alloy rods.

In use, in high temperature treatment processes, say at temperatures of 2,300° F., the molybdenum in the strengthening core 20 may crystallize and become brittle. Since, however, it is surrounded and tightly held by protective covering 18 and either does not crystallize at all or, to the extent it crystallizes, remains locked in position by the protective core and cannot shatter, it retains substantially all of the strength needed for supporting the materials being treated. Similarly, even though the protective covering may approach softening temperatures, it does not distort, because it is held in position by the structural rigidity of the molybdenum. Since the protective covering does not crystallize, it complements the molybdenum.

The rods of this invention may be of circular cross-section or, if desired for particular purposes, rectangular or other cross-sections. Other materials than molybdenum, such as tungsten or graphite may be used for strengthening core 20; and the protective covering 18 can be made of other alloys as long as they satisfy the criteria indicated.

I claim:

1. A heat resistant, structurally stable rod for racks or baskets used in high-temperature heat treatment processes, said rod including
   a strengthening core having a melting point higher than temperatures used in said heat treatment processes and capable of maintaining rigidity and not softening at said process temperatures, said core crystallizing at temperatures less than said process temperatures, and
   a protective covering of weldable material encasing said strengthening core, said material having a crystallization temperature higher than said process temperature and being of sufficient thickness to be welded and to maintain said core agaist frangibility at temperatures up to said process temperature,
   said protective covering being tightly secured around the outer surface of said strengthening core for constraining said strengthening core to provide that said strengthening core will be held together substantially in its initial position relative to said protective covering in the event that said strengthening core crystallizes so that the structural supporting strength of said strengthening core will be utilized even if said strengthening core crystallizes,
   said strengthening core having a diameter between about 0.1875" and about 0.500".

2. A structurally stable rod as set forth in claim 1 in which the strengthening core is dimensioned to have sufficient strength, by itself, to be capable of use in said racks or baskets.

3. A structurally stable rod as set forth in claim 1 in which said protective covering is of sufficient thickness to be welded to a similar rod.

4. A structurally stable rod as set forth in claim 1 in which said strengthening core and said protective cover are frictionally interengaged.

5. A heat resistant, structurally stable, weldable rod for use in making racks, baskets, and the like for use in high temperature heat treatment processes, said rod including
   a strengthening core and a protective covering surrounding and encasing said core,
   said strengthening core being made of material which will remain rigid at temperatures greater than 2,300° F.
   said protective covering being made of material that is weldable, ductile, and will not crystallize at temperatures below 2,300° F.
   said core having a cross-section great enough to support materials being heat treated, and
   said protective covering being thick enough to be welded and to retain said core in position in the event of crystallization of said core,
   said protective covering being tightly secured around the outer surface of said strengthening core for constraining said strengthening core to provide that said strengthening core will be held together substantially in its initial position relative to said protective covering in the event that said strengthening core crystallizes so that the structural supporting strength of said strengthening core will be utilized even if said strengthening core crystallizes,
   said protective covering being about 100 mils thick and being an alloy having the characteristics of AISI 330.

6. A support as claimed in claim 1 in which said strengthening cores of said rods are made of molybdenum.

7. A heat treatment support, such as a rack or basket, for use in high temperature heat treatment processes, said support being formed of welded rods, said rods including
   an inner strengthening core and an outer protective covering, said covering encasing said core,
   said core being formed of material having a melting point higher than said process temperature, but crystallizing at a temperature lower than said process temperature, and
   said protective covering being formed of material having a crystallization temperature higher than said process temperature and being of sufficient thickness to maintain said core against frangibility at temperatures as high as said process temperatures,
   said protective covering being tightly secured around the outer surface of said strengthening core for constraining said strengthening core to provide that said strengthening core will be held together substantially in its initial position relative to said protective covering in the event that said strengthening core crystallizes so that the structural supporting strength of said strengthening core will be utilized even if said strengthening core crystallizes.

8. A structurally stable rod as claimed in claim 1 wherein said strengthening core is made of molybdenum.

9. A structurally stable rod as claimed in claim 1 wherein said strengthening core is made of tungsten.

10. A structurally stable rod as claimed in claim 1 wherein said strengthening core is made of graphite.

11. A support as claimed in claim 7 in which said strengthening cores of said rods are made of tungsten.

12. A support as claimed in claim 7 in which said strengthening cores of said rods are made of graphite.

13. A heat resistant, structurally stable rod for racks or baskets used in high-temperature heat treatment processes, said rod including
   a strengthening core having a melting point higher than temperatures used in said heat treatment processes and capable of maintaining rigidity and not softening at said process temperatures, said core crystallizing at temperatures less than said process temperatures, and
   a protective covering of weldable material encasing said strengthening core, said material having a crystallization temperature higher than said process temperature and being of sufficient thickness to be welded and to maintain said core against frangibility at temperatures up to said process temperature, said protective covering being tightly secured around the outer surface of said strengthening core for constraining said strengthening core to provide that said strengthening core will be held together substantially in its initial position relative to said protective covering in the event that said strengthening core crystallizes so that the structural supporting strength of said strengthening core will be utilized even if said strengthening core crystallizes, said protective covering being of sufficient thickness to be welded to a similar rod, said sufficient thickness being at least about 0.030".

* * * * *